June 24, 1958  A. L. MEYER  2,839,847
DITCHER
Filed Jan. 18, 1956  3 Sheets-Sheet 1
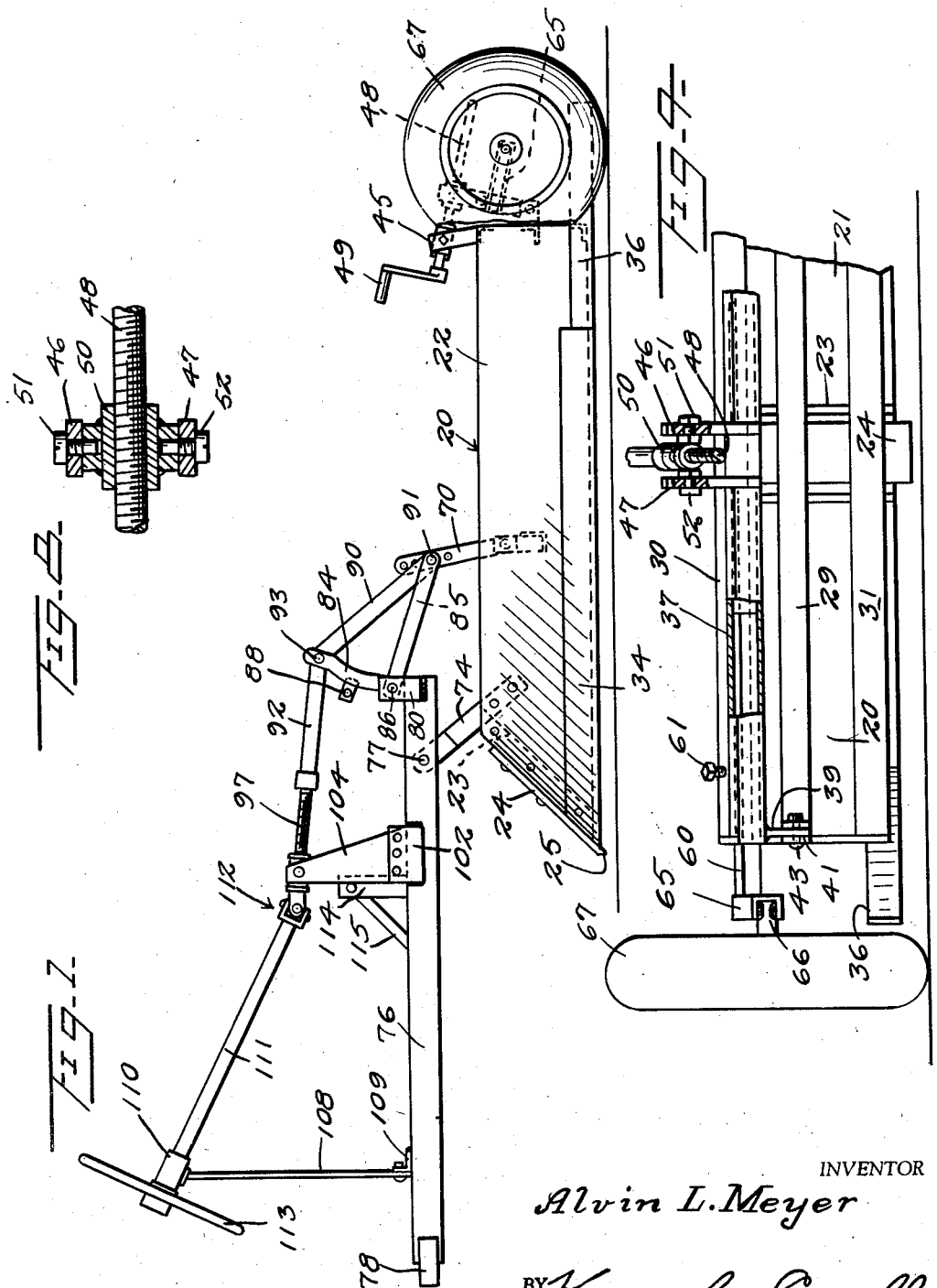
INVENTOR
Alvin L. Meyer
BY Kimmel & Crowell
ATTORNEYS

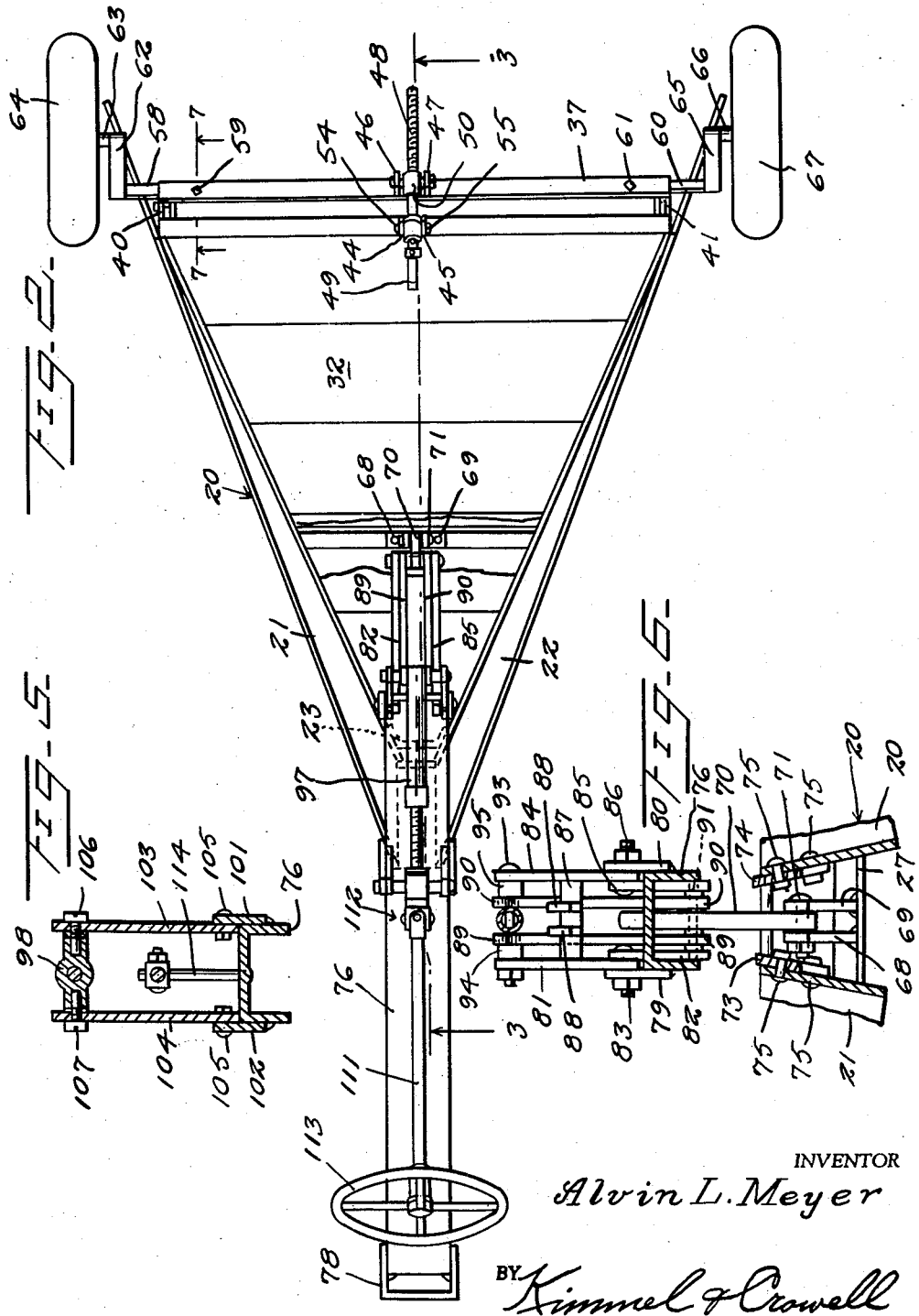

June 24, 1958 — A. L. MEYER — 2,839,847
DITCHER
Filed Jan. 18, 1956 — 3 Sheets-Sheet 3
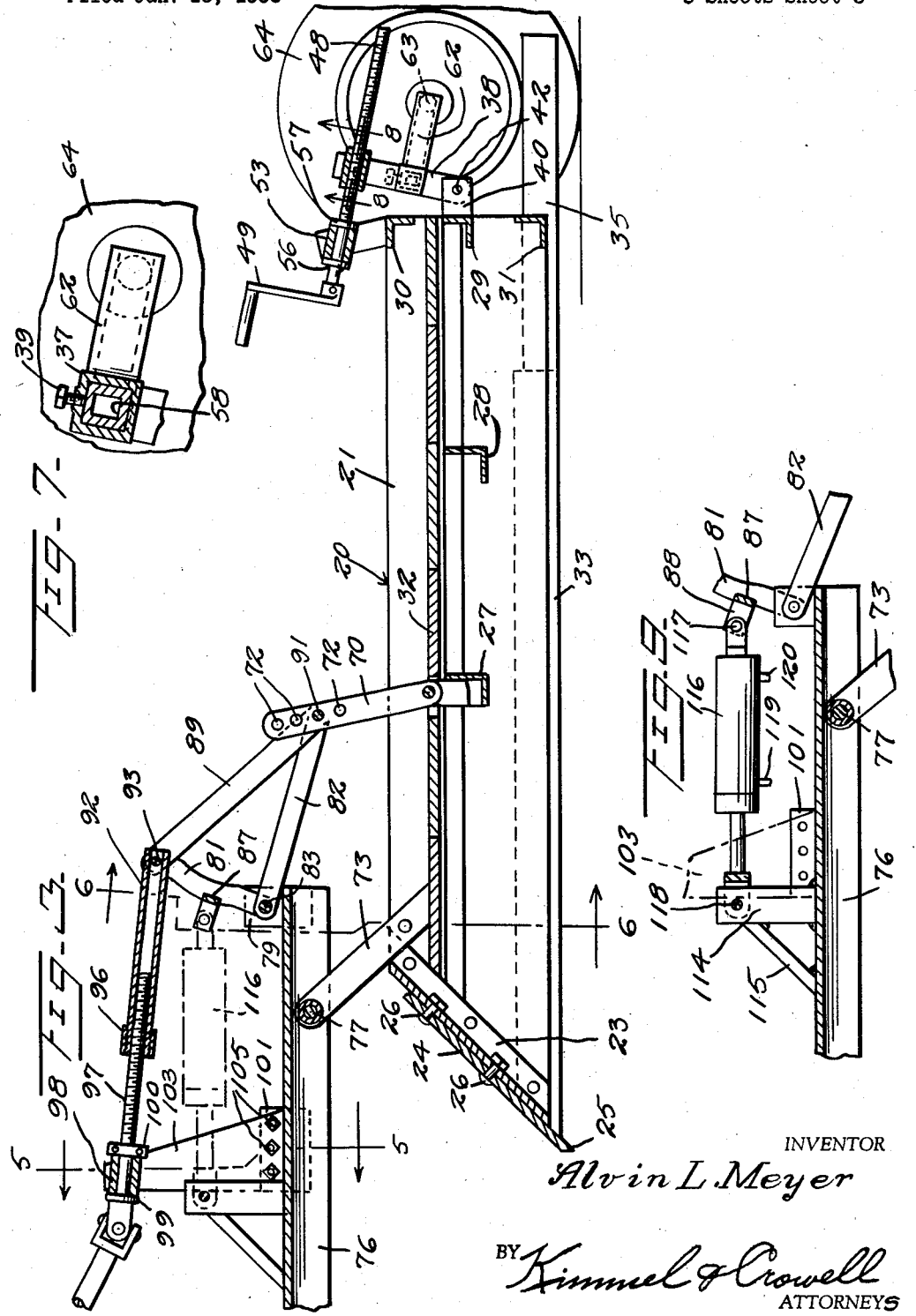
INVENTOR
Alvin L. Meyer
BY Kimmel & Crowell
ATTORNEYS

2,839,847

DITCHER

Alvin L. Meyer, Fairfield, Mont.

Application January 18, 1956, Serial No. 559,955

3 Claims. (Cl. 37—98)

The present invention relates to a ditch digging device of the type disclosed in my prior Patent No. 2,188,892 dated January 30, 1940, and more particularly to an improved ditcher adjusting mounting.

The primary object of the invention is to provide a ditcher mechanism in which the ditching blade forms its own frame and can be vertically adjusted and simultaneously angularly adjusted.

Another object of the invention is to provide a ditcher in which the angle of attack of the ditching blade can be varied without varying the vertical elevation of the blade.

A further object of the invention is to provide a ditcher mechanism in which the vertical elevation of the ditcher blade can be varied without varying the angle of attack of the blade.

A still further object of the invention is to provide a ditcher mechanism of the class described above which will be positive in action, inexpensive to manufacture, and simple to manipulate during operation.

Other objects and advantages will become apparent in the following specification when considered in the light of the attached drawings, in which:

Figure 1 is a side elevation of the invention shown partly broken away.

Figure 2 is a top plan view of the invention shown partly broken away.

Figure 3 is a longitudinal cross-section taken along the line 3—3 of Figure 1, looking in the direction of the arrows, and partly broken away for clarity.

Figure 4 is a fragmentary rear elevation of the invention.

Figure 5 is a transverse fragmentary detailed cross-section taken along the line 5—5 of Figure 3, looking in the direction of the arrows.

Figure 6 is an enlarged fragmentary transverse cross-section taken along the line 6—6 of Figure 3, looking in the direction of the arrows.

Figure 7 is an enlarged fragmentary detailed longitudinal cross-section taken along the line 7—7 of Figure 2, looking in the direction of the arrows.

Figure 8 is an enlarged fragmentary horizontal cross-section taken along the line 8—8 of Figure 3, looking in the direction of the arrows.

Figure 9 is a fragmentary longitudinal cross-section of a modified operating mechanism.

Referring now to the drawings in detail wherein like reference numerals indicate like parts throughout the several figures, reference numeral 20 indicates generally a ditching plow of the same type disclosed in my aforementioned patent, having a pair of opposed sides 21 and 22 and having a channel-shaped nose member 23 joining the sides 21 and 22 at their forward ends. A plow point 24 forms a generally rectangular blade having a cutting edge 25 on the lower end thereof and is secured to the forward portion of the plow 20 in contact with the nose member 23 by means of securing bolts 26.

The plow 20 is provided with transverse brace frame members 27, 28 and 29 which extend from side 21 to side 22, bracing the plow 20 against external stresses. The rear of the plow 20 is further provided with an upper transverse cross brace 30 and a lower transverse cross brace 31. The upper edges of the cross braces 27, 28 and 29 are horizontally aligned and support a platform 32 thereon.

The lower edges of the sides 21 and 22 are provided with moldboards 33 and 34 which can be replaced when worn out. The rear portion of the lower edges of the sides 21 and 22 are provided with wing moldboard extensions 35 and 36 which extend rearwardly of the plow 20.

A square tubular transverse shaft 37 is positioned rearwardly of the plow 20 and is provided with a pair of ears 38 and 39 which extend from opposite ends of the shaft 37 in parallel relation. A pair of brackets 40 and 41 are secured to opposite ends of the cross frame 29 and extend rearwardly therefrom. The ears 38 and 39 are pivotally secured to the brackets 40 and 41, respectively, by means of pivot bolts 42 and 43.

The cross frame member 30 at the upper rear of the plow 20 is provided with a pair of spaced apart upstanding arms 44 and 45. The arms 44 and 45 are positioned closely adjacent to the longitudinal center line of the plow 20 and on opposite sides thereof. The shaft 37 is provided with a pair of upstanding arms 46 and 47 which are spaced apart in parallel relation substantially aligned with the arms 44 and 45. A screw shaft 48 is provided with a crank handle 49 at one end and is positioned so as to extend between the arms 44, 45 and the arms 46, 47.

A sleeve nut 50 engages the threaded shaft 48 and is mounted between the arms 46 and 47 by pivot bolts 51 and 52. A bearing 53 is pivotally mounted between the plates 44 and 45 by pivots 54 and 55. The shaft 48 extends through the bearing 53 and is provided with a pair of collars 56 and 57 which are positioned on opposite sides of the bearing 53 to hold the shaft 48 therein. Rotation of the shaft 48 by the crank 49 will move the nut 50, the arms 46 and 47, and the shaft 37, thus rotating the shaft 37 in the brackets 40 and 41.

A shaft 58 is telescopically carried on one end of the shaft 37 and adjustably secured therein by means of a set screw 59. A shaft 60 is telescopically carried in the opposite end of the shaft 37 and secured therein by a set screw 61. An arm 62 extends from the outer end of the shaft 58 at right angles thereto and is provided with a stub axle 63 at its outer end projecting parallel to the shaft 58 for carrying a wheel 64 in a conventional manner. The shaft 60 is likewise provided at its outer end wtih an arm 65 which projects perpendicularly therefrom and has a stub shaft 66 on its outer end in axial alignment wtih the stub shaft 63. A wheel 67 is mounted to the stub shaft 66 in any conventional manner.

By referring to Figures 2 and 3, it can be clearly seen that rotation of the shaft 37 in the brackets 40 and 41 will cause the wheels 64 and 67 to raise and lower the rear end of the plow 20 with relation to the earth's surface.

A pair of ears 68 and 69 are secured in spaced apart relation to the frame member 27 on opposite sides of the longitudinal center thereof. A link 70 is pivotally secured between the ears 68 and 69 by means of a pivot bolt 71. The upper end of the link 70 is provided with a plurality of vertically spaced transversely extending bores 72. A pair of arms 73 and 74 are rigidly secured to the upper forward portions of the walls 21 and 22 by means of securing bolts 75. The arms 73 and 74 extend forwardly and upwardly at an angle.

A channel-shaped tongue 76 is pivotally secured to the upper forward ends of the arms 73 and 74 by a pivot bolt 77. The forward end of the tongue 76 carries a conventional hitch member 78 for attaching the tongue 76 to a tractor or like towing vehicle. A pair of brackets 79 and 80 are secured in parallel relation to opposite sides of the tongue 76 and extend upwardly above the upper face of the tongue 76.

An upwardly extending link 81 and a rearwardly extending link 82 are pivotally secured to the bracket 79 by a pivot bolt 83. An upwardly extending link 84 and a rearwardly extending link 85 are pivotally secured to the bracket 80 by means of a pivot bolt 86.

A transverse bar 87 extends between the links 81 and 84 and carries a forwardly extending U-shaped bracket 88 thereon. A pair of links 89 and 90 are positioned in parallel relation on opposite sides of the link 70. A pivot bolt 91 secures the rear end of the links 82 and 85 and the rear ends of the links 89 and 90 to one of the portions 72 in the link 70. The forward ends of the links 89 and 90 are positioned inwardly of the upper ends of the links 81 and 84.

A tubular shaft 92 has its rear end positioned between the links 89 and 90. A pivot bolt 93 extends through the upper ends of the links 81 and 84, the forward ends of the links 89 and 90, and the tubular shaft 92, pivotally securing these members together. Spacers 94 and 95 are positioned between the links 81 and 89 and the links 90 and 84, respectively, as illustrated in Figure 6.

The forward end of the tubular shaft 92 is provided with a threaded sleeve 96. A threaded shaft 97 engages through the threaded sleeve 96 and telescopes within the tubular shaft 92. A bearing 98 engages over the forward end of the threaded shaft 96. A collar 99 engages the forward end of the bearing 98 and is secured to the shaft 97. A thrust collar 100 engages the rear of the bearing 98 and is secured to the shaft 97 so that the shaft 97 is restrained from axial movement through the bearing 98.

A pair of brackets 101 and 102 are welded to opposite sides of the tongue 76 in vertically aligned relation to the bearing 98. A pair of bearing support arms 103 and 104 are detachably secured to the brackets 101 and 102 by bolts 105. The bearing 98 is pivotally secured between the upper ends of the support plates 103 and 104 by pivot bolts 106 and 107. A support 108 is secured to the forward portion of the tongue 76 by means of a cleat 109 and extends vertically upwardly from the tongue 76.

A bearing sleeve 110 is secured to the upper end of the support 108 and has a shaft 111 extending therethrough. A universal joint, generally indicated at 112, secures the rear of the shaft 111 to the forward end of the threaded shaft 97. A hand wheel 113 is carried by the forward end of the shaft 111 and is used for rotating the threaded shaft 97 when desired. A mounting plate 114 is secured to the upper side of the tongue 76 and is provided with a brace 115 extending from the upper end thereof forwardly and downwardly to the tongue 76.

Referring now to Figure 9, a modified operating structure is disclosed in which a hydraulic ram 116 is secured by pivot bolt 117 to the bracket 88 at one end thereof and by a pivot bolt 118 to the upper end of the plate 114 at the other end thereof. When the hydraulic ram 116 is used, the tubular shaft 92 is disconnected from the pivot bolt 93, the plates 103 and 104 are disconnected from the brackets 102 and support 108 is disconnected from the cleat 109 so that the hand operating mechanism is completely removed. Obviously, the ram 116 is adapted to be connected by means of fittings 119 and 120 to a source of hydraulic pressure (not shown).

In the use and operation of the invention, it is intended to form a ditch by means of the point 24 of the plow 20 and diverging side walls 21 and 22 so that the rear wheels 64 and 67 will straddle the newly formed ditch as the ditcher moves forwardly. The ditcher is adapted to be towed by a tractor (not shown) to which the hitch 78 of the tongue 76 is connected.

The vertical adjustment of the plow 20 is accomplished by rotating the hand wheel 113 causing the shaft 97 to move the shaft 92 and rotate the links 81 and 84 about the pivots 83 and 86, and simultaneously moving the links 89 and 90 and the links 82 and 85 so as to move the link 70 to cause the tongue 76 to pivot about the pivot 77 to raise or lower the forward end of the ditcher 20. The hand crank 49 is rotated to adjust the height of the rear of the plow 20 by moving the rear of the plow 20 vertically with relation to the wheels 64 and 67.

The angle of attack of the plow 20 with relation to the ground can be adjusted by varying the amount of adjustment of the forward and rear portions of the plow 20. Thus a relatively steep angle of attack can be utilized with a shallow cut, or a relatively shallow angle of attack can be utilized with a relatively deep cut, and any other combinations of angle of attack and depth can be utilized when the soil conditions require variations from normal settings. Obviously, the elimination of the frame and the provision of a more complete adjustability of the device permits the ditcher to be economically utilized under a greater number of varying conditions than has been heretofore possible.

Having thus described the preferred embodiments of the invention, it should be understood that numerous other modifications and structural adaptations may be resorted to without departing from the scope of the appended claims.

What is claimed is:

1. A ditcher comprising a plow having a pair of rearwardly divergent sides, a pair of oppositely disposed wheels, means securing said wheels to opposite rear edges of said plow for vertical and horizontal adjustment thereon, a tongue, a pair of links fixed to and extending upwardly from the forward ends of said sides, means pivoting said tongue to the upper ends of said links in vertically spaced relation to the forward portion of said plow, a second pair of links pivotally secured to said plow rearwardly of said first pair of links, and means extending between said tongue and said second pair of links for pivoting said tongue with relation to said plow whereby the forward portion of said plow is vertically adjusted with relation to the forward portion of said tongue.

2. A device as claimed in claim 1 wherein the means for pivoting said tongue with relation to said plow includes a hand adjusted screw shaft.

3. A device as claimed in claim 1 wherein the means for pivoting said tongue with relation to said plow includes a hydraulic ram.

References Cited in the file of this patent

UNITED STATES PATENTS

| 2,235,670 | Chattin | Mar. 18, 1941 |
| 2,261,874 | Cundiff | Nov. 4, 1941 |
| 2,651,858 | Schwindt | Sept. 15, 1953 |
| 2,662,311 | Chattin | Dec. 15, 1953 |
| 2,673,408 | Meyer | Mar. 30, 1954 |

FOREIGN PATENTS

| 165,129 | Australia | Sept. 12, 1955 |
| 466,477 | Canada | July 11, 1950 |
| 675,959 | Great Britain | July 16, 1952 |